(12) United States Patent
Loeffler et al.

(10) Patent No.: US 7,083,543 B2
(45) Date of Patent: Aug. 1, 2006

(54) METHOD FOR SETTING A DESIRED OPERATING STATE OF A HYBRID DRIVE OF A VEHICLE

(75) Inventors: Juergen Loeffler, Ludwigsburg (DE); Stefan Tumback, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 10/467,432

(22) PCT Filed: Nov. 14, 2002

(86) PCT No.: PCT/DE02/04203

§ 371 (c)(1),
(2), (4) Date: Jan. 6, 2004

(87) PCT Pub. No.: WO03/053733

PCT Pub. Date: Jul. 3, 2003

(65) Prior Publication Data

US 2004/0097327 A1 May 20, 2004

(30) Foreign Application Priority Data

Dec. 6, 2001 (DE) ............... 101 60 018

(51) Int. Cl.
*B60K 1/02* (2006.01)

(52) U.S. Cl. .......................... 477/3; 477/107

(58) Field of Classification Search ............ 477/2, 477/3, 7, 107
See application file for complete search history.

(56) References Cited

U.S. PATENT DOCUMENTS

| 6,301,529 B1 | 10/2001 | Itoyama et al. |
| 6,397,601 B1 | 6/2002 | Morimoto et al. |
| 6,453,864 B1 * | 9/2002 | Downs et al. ............ 123/179.3 |
| 6,516,253 B1 * | 2/2003 | Boggs et al. ................ 701/20 |

FOREIGN PATENT DOCUMENTS

| DE | 4344053 | * 7/1994 |
| JP | 6-80048 | * 3/1994 |

* cited by examiner

*Primary Examiner*—Ha Ho
(74) *Attorney, Agent, or Firm*—Kenyon & Kenyon LLP

(57) ABSTRACT

A method of setting a setpoint operating state of a hybrid drive of a vehicle, where the hybrid drive includes as drive motors an internal combustion engine and at least one electric motor, and the output shafts of the drive motors are mechanically linkable to a drive train of the vehicle. Depending on the instantaneous power demand on the drive motors of the hybrid drive and the instantaneous power capacity of the drive motors of the hybrid drive, an optimal crankshaft speed of the combustion engine may be determined, and this crankshaft speed may be set by coordinated actuation of the drive motors of the hybrid drive, while maintaining the instantaneous power demands.

11 Claims, 5 Drawing Sheets

METHOD FOR SETTING A DESIRED OPERATING STATE OF A HYBRID DRIVE OF A VEHICLE

FIELD OF THE INVENTION

The present invention relates to a method for setting a setpoint operating state of a hybrid drive of a vehicle, where the hybrid drive includes as drive motors an internal combustion engine and at least one electric motor, and the output shafts of the drive motors are mechanically linkable to a drive train of the vehicle.

BACKGROUND INFORMATION

In some hybrid drives for vehicles, an internal combustion engine is combined with at least one electric motor, so that a plurality of drive sources are available for the vehicle. Corresponding to demands made by a vehicle driver, the drive sources can feed their input torques optionally into a drive train of the vehicle. This sometimes produces, depending on concrete driving situations, various drive design possibilities, which serve, e.g., to improve driving convenience and to reduce energy usage, as well as to reduce the emission of pollutants.

Some hybrid drives for vehicles are arranged in serial configurations, parallel configurations or mixed configurations of the combustion engine and electric motors. Depending on the configuration, the electric motors may be switched directly or indirectly into the drive train of the internal combustion engine. For mechanical linkage of the combustion engine and/or electric motors, they may be configured so that they are mechanically linkable with each other via transmissions, for example planetary gears or the like, and clutches.

In order to be able to optimally implement a driver's wish for drive power from the hybrid drive, coordinated actuation of the drive motors of the hybrid drive may be necessary; this may be accomplished by an engine control unit. Actuation of the drive motors may take place on the basis of a setpoint operating state of the hybrid drive to be determined by the engine control unit. The goals in determining this setpoint operating state may be, e.g., low fuel consumption, dynamic driving behavior of the vehicle, and low pollutant emission. A driving behavior of the vehicle is determined decisively here by the dynamic power reserve of the hybrid drive that is available at the setpoint operating states set by the engine control unit. Sometimes, the setpoint operating states may be set by controlling the combustion engine. The additional degree of freedom resulting from the additional electric drive motors is not taken into account here.

SUMMARY OF THE INVENTION

An exemplary embodiment of the method according to the present invention may have the advantage that in hybrid drives having a combustion engine and at least one electric motor, actuation of all drive motors of a hybrid drive may be optimal for setting a setpoint operating state. Due to the fact that, depending on the instantaneous power demand on the drive motors of the hybrid drive and the instantaneous power capacity of the drive motors of the hybrid drive, an optimal crankshaft speed of the combustion engine is determined, and that this crankshaft speed is set by coordinated actuation of the drive motors while maintaining the power demands, it may be advantageously possible to set a setpoint operating state of the hybrid drive optimally in regard to fuel consumption, dynamic driving behavior and low pollutant emission.

An exemplary embodiment of the present invention provides that the optimal crankshaft speed may be selected from a rotational speed range which lies between an optimal crankshaft speed for economical driving operation and an optimal crankshaft speed for power-oriented driving operation. This makes it advantageously possible, when determining the optimal crankshaft speed, to select a manner of operation of the combustion engine that is especially favorable in regard to both fuel consumption and pollutant emission, while still providing optimally for a necessary dynamic driving behavior.

DETAILED DESCRIPTION

Figure 1:
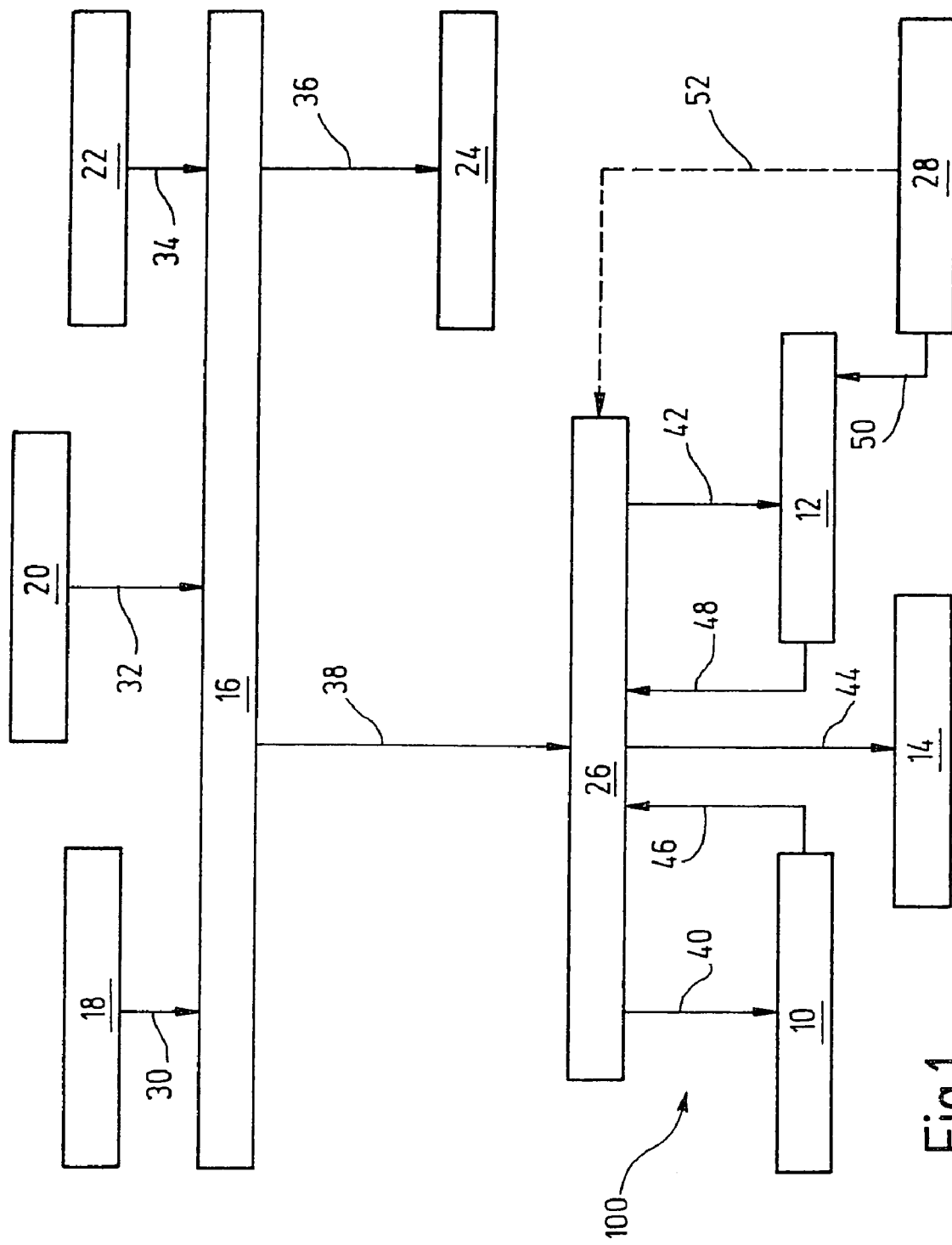
FIG. 1 shows a schematic diagram of an exemplary embodiment of the method according to the present invention.

FIG. 1 shows a schematic diagram of an exemplary embodiment of an engine control unit for actuating a hybrid drive of a vehicle according to an exemplary embodiment of the present invention. The hybrid drive includes a combustion engine 10 and at least one electric motor 12. These act on a drive train of the vehicle through a transmission 14.

The engine control unit includes a coordinator 16 of longitudinal motions in or counter to an imagined direction of travel of the vehicle. These longitudinal motions of the vehicle are initiated by a request from a vehicle driver, for example, through an accelerator pedal 18 and a brake pedal 20. A request may also be made on the longitudinal motion of the vehicle by an automatic drive controller 22. It is possible via accelerator pedal 18 and/or brake pedal 20 and/or automatic drive controller 22 to request an acceleration or deceleration of the vehicle in the longitudinal direction, which is implemented by hybrid drive 100 or a braking device 24 of the vehicle. A coordinator 26 is provided for coordinated actuation of hybrid drive 100, that is, of the individual components of hybrid drive 100. The vehicle also includes a vehicle electrical system 28 to supply power to the electric motors 12 and other electrical components of the vehicle. A component of vehicle electrical system 28 is a vehicle battery from which the vehicle electrical system is supplied.

From accelerator pedal 18, coordinator 16 receives a signal 30 that requests a setpoint power at the output of transmission 14. From brake pedal 20, coordinator 16 receives a signal 32 that requests a setpoint torque at the wheels of the vehicle. Finally, from automatic drive controller 22, coordinator 16 receives a signal 34 that requests a longitudinal acceleration of the vehicle. Coordinator 16 evaluates and processes signals 30, 32 and 34 and provides a signal 36 corresponding to the setpoint braking torque requested by braking system 24. Coordinator 16 also provides a signal 38 that corresponds to a setpoint drive power at the output of transmission 14 and is requested by coordinator 26 for hybrid drive 100. Corresponding to signal 38, coordinator 26 is responsible for determining the setpoint operating state of hybrid drive 100 and the resulting actuation of drive motors 10 and 12. Drive motors 10 and 12 are actuated in such a way that the setpoint drive power corresponding to signal 38 is implemented at the output of transmission 14. To this end, coordinator 26 gives combustion engine 10 a signal 40 that corresponds to a setpoint output torque of combustion engine 10. In addition, coordinator 26 gives a signal 42 to electric motor 12, or in the case of a plurality of electric motors 12, to electric motors 12, that corresponds in each case to the setpoint output torques of electric motors 12. At the same time, transmission 14 receives a signal 44 that corresponds to a setpoint gear or a setpoint transmission ratio of transmission 14.

Combustion engine 10 provides a signal 46 to coordinator 26 that corresponds to the instantaneous power capacity of combustion engine 10. Furthermore, electric motor or motors 12 provide a signal 48 to coordinator 26 that corresponds to the instantaneous power capacity of electric motors 12. These instantaneously available power capacities 46 and 48 of drive motors 10 and 12 are taken into account by coordinator 26 when providing signals 40 and 42 for the requested setpoint signals.

When providing signal 48 corresponding to the power capacity of electric motors 12, consideration may be given to a signal 50 which corresponds to the instantaneous power capacity of vehicle electrical system 28, and, e.g., of the vehicle battery integrated into electrical system 28. Finally, vehicle electrical system 28 provides an additional signal 52 to coordinator 26, which corresponds to the instantaneous electric power demand of additional components, ancillary units or the like, of the vehicle.

In FIG. 1, the coordinated actuation of drive motors 10 and 12 of hybrid drive 100 by coordinator 26 may be dependent on a setpoint drive power (signal 38), the instantaneous power capacities of combustion engine 10 (signal 46) and electric drive motors 12 (signal 48), and additional power demands (signal 52) of the vehicle. This permits optimal setting of the setpoint operating state of hybrid drive 100 through consideration of the explained parameters, resulting, e.g., in low fuel consumption by combustion engine 10, low pollutant emission by combustion engine 10, and optimal provision of the dynamic power reserve of hybrid drive 100.

Figure 2:
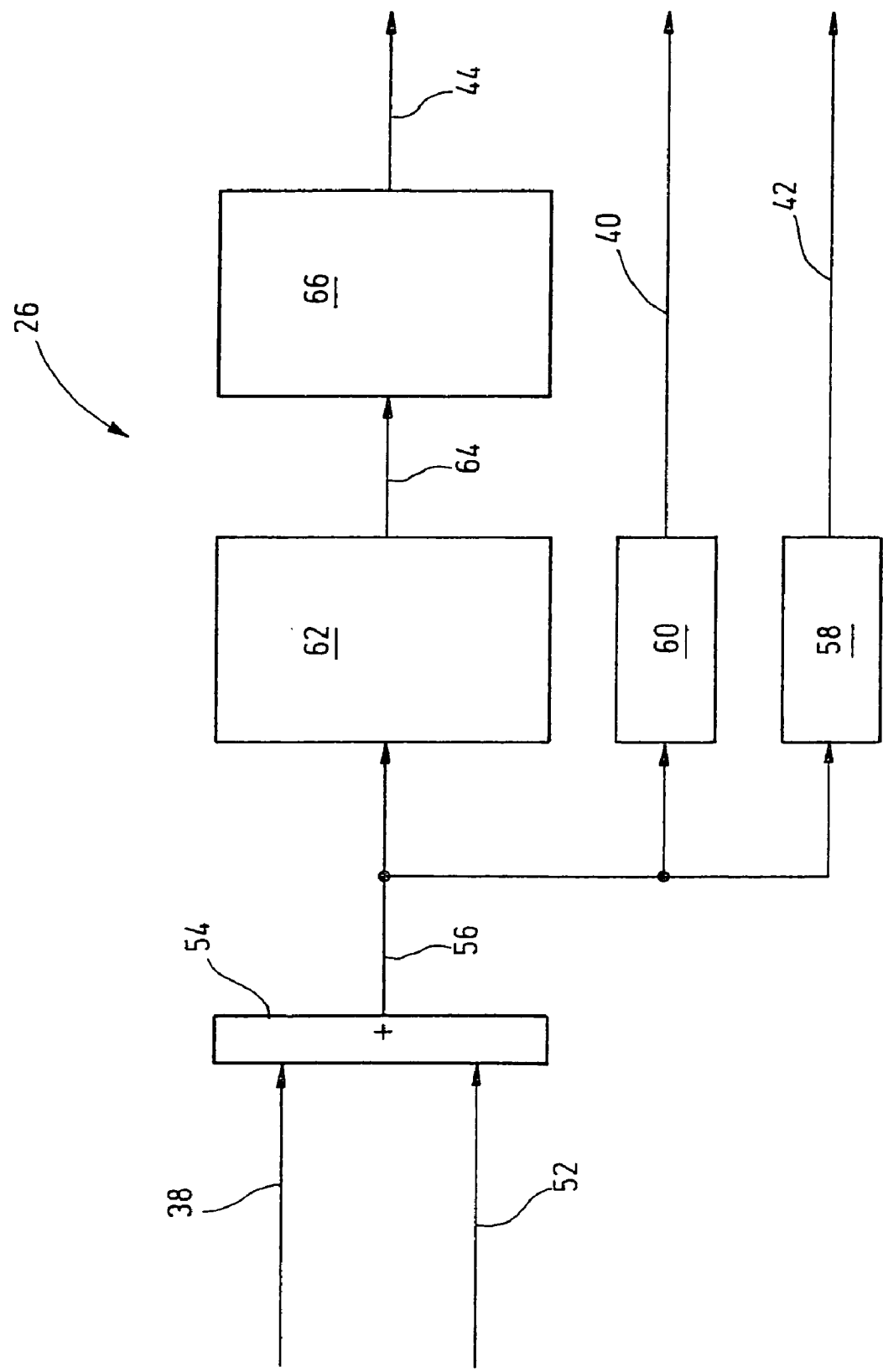
FIG. 2 shows a schematic diagram of a coordinated actuation of the hybrid drive according to an exemplary embodiment of the present invention.

FIG. 2 shows a schematic diagram of an exemplary embodiment of coordinator 26 for hybrid drive 100 according to an exemplary embodiment of the present invention. Here signals 38 and 52 are fed to a summing element 54, which provides a signal 56 corresponding to the setpoint power of hybrid drive 100. This signal 56 is fed to an actuator 58 for electric motors 12, which uses it to provide signal 42. Signal 56 is also fed to an actuator 60, which provides signal 40 in each instance for the setpoint torque of combustion engine 10. Finally, signal 56 is fed to an arithmetic block 62, which determines the setpoint operating state of hybrid drive 100. The setpoint operating state of hybrid drive 100 is represented by an optimal crankshaft speed of combustion engine 10, which is fed as signal 64 to an arithmetic block 66, which provides signal 44 to transmission 14 corresponding to a setpoint gear or setpoint transmission ratio of transmission 14. This procedure makes it possible for the crankshaft speed of combustion engine 10 to be adjusted with maximum exactness or at least better accuracy.

Figure 3:
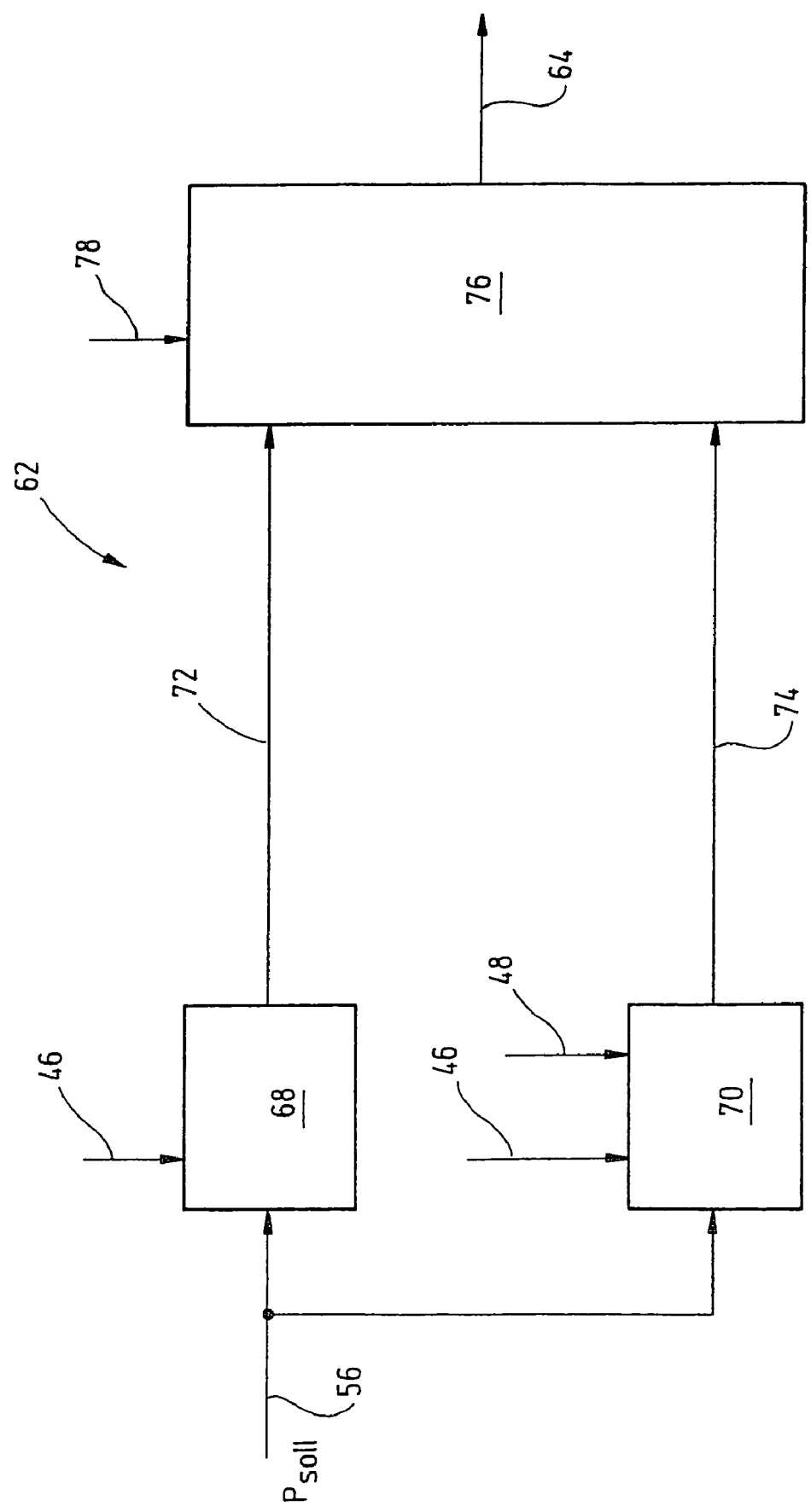
FIG. 3 shows a schematic diagram for determining an optimal rotational speed of the combustion engine according to an exemplary embodiment of the present invention.

FIG. 3 shows a schematic diagram of an exemplary embodiment of arithmetic logic unit 62 for determining the optimal crankshaft speed of combustion engine 10. It becomes clear that signal 56 corresponding to the setpoint power is fed to a first optimizing element 68 and a second optimizing element 70. Also fed to first optimizing element 68 as a parameter is signal 46 corresponding to the instantaneous power capacity of combustion engine 10. By combining signals 56 and 46, optimizing element 68 supplies a signal 72 which corresponds to the optimal crankshaft speed of combustion engine 10 from the perspective of economy. Here signal 46 corresponding to the instantaneous power capacity of combustion engine 10 is evaluated, e.g., in consideration of the maximum power of combustion engine 10 as a function of the crankshaft speed and the operating efficiency of combustion engine 10 and of electric motor 12, allowing for their known characteristic data. At the same time consideration may also be given, e.g., to the instantaneous operating conditions, such as atmospheric air pressure, engine temperature and the like. By combining these parameters, it is possible to provide signal 72, which corresponds to the optimal crankshaft speed of combustion engine 10 for maximum economy of driving operation.

Signal 46, corresponding to the instantaneous power capacity of combustion engine 10, and signal 48, corresponding to the instantaneous power capacity of electric motors 12, are also fed to second optimizing element 70. Consideration is given here in each case to the maximum power of combustion engine 10 and the maximum power of electric motors 12 usable for propelling the vehicle, in each case dependent on the crankshaft speed of combustion engine 10 in consideration of the instantaneous operating conditions, such as atmospheric air pressure, engine temperature and the like. Furthermore, the maximum power of electric motors 12 usable for propelling the vehicle in consideration of the charge level of the vehicle battery and its service life.

By processing signals 56, 46 and 48, optimizing element 70 provides a signal 74 that determines the optimal crankshaft speed of combustion engine 10 for power-oriented driving operation.

The optimal crankshaft speed of combustion engine 10 in consideration of economical driving operation (signal 72) and the optimal crankshaft speed in consideration of power-oriented driving operation of combustion engine 10 (signal 74) are fed to an arithmetic logic unit 72, which ultimately determines from the bandwidth of optimal crankshaft speeds specified by signals 72 and 74 the optimal crankshaft speed of combustion engine 10 for the setpoint operating state, as signal 64. Parameters considered here are signals 78, which take into account an instantaneous driving situation of the motor vehicle, such as acceleration, deceleration and the like, and/or a type of driver of the motor vehicle, such as a dynamic driver, cautious driver or the like. These signals 78 may be read out from instantaneous, possibly temporarily stored signals about the driving behavior of the motor vehicle over time.

Figure 4:
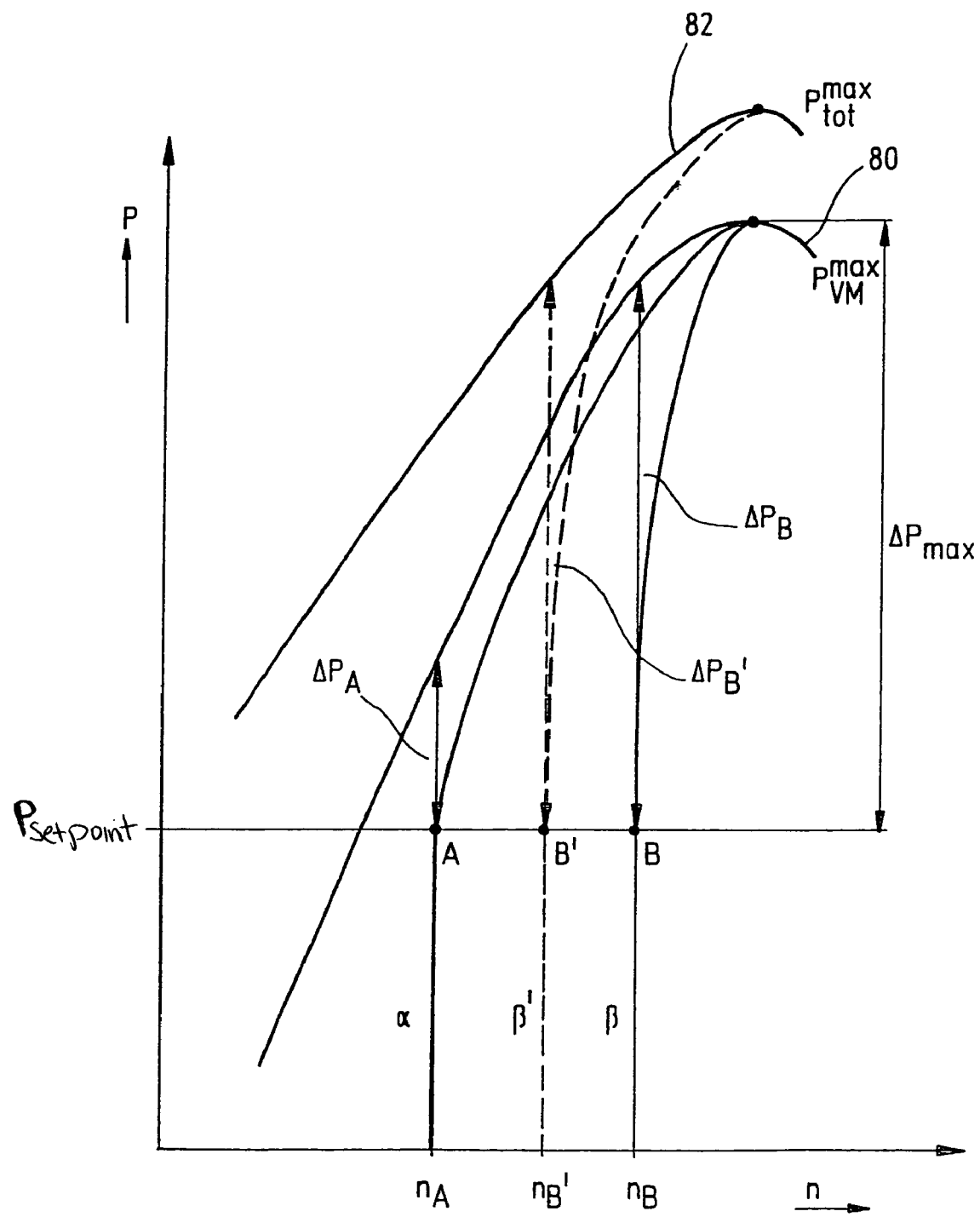
FIG. 4 shows characteristic curves for determining the optimal rotational speed of the combustion engine according to an exemplary embodiment of the present invention.

In accordance with an exemplary embodiment of the method according to the present invention, FIG. 4 shows a characteristics field, with power P of hybrid drive 100 being plotted in each case over rotational speed n of combustion engine 10. A first characteristic 80 corresponds to maximum power $P_{max}$ of combustion engine 10. A second characteristic 82 corresponds to maximum power $P_{max}$ of hybrid drive 100 in consideration of the maximum power of combustion engine 10 and the maximum powers of electric motors 12 depending on rotational speed n.

To determine the optimal crankshaft speed of combustion engine 10, the following exemplary embodiment of a procedure according to the present invention may be used:

1. A control line a may be determined which connects the points of minimum fuel consumption of the characteristics field of combustion engine 10 for each power P.

2. A control line β may be determined, for which the dynamic power reserve at each point takes a defined value in reference to maximum power $P_{max}$ of combustion engine 10. This defined value may be stipulated by a constant quotient $\Delta P/\Delta P_{max}$. Here $\Delta P$ is the dynamic power reserve at the observed operating state and $\Delta P_{max}$ is the maximum possible power reserve at setpoint power $P_{setpoint}$ of the observed operating state.

3. A control line β' may be determined, for which the dynamic power reserve in reference to maximum power $P_{max82}$ corresponds to the power reserve of control line β. In an exemplary embodiment, control line β' is determined so that it does not exceed the curve of maximum power $P_{max80}$ of combustion engine 10.

4. Optimal crankshaft speed $n_A$ of combustion engine 10 for economical driving operation may be determined. This corresponds to signal 72 (FIG. 3). This optimal rotational speed $n_A$ may be determined by the intersection of the straight line corresponding to setpoint power $P_{setpoint}$ with control line α.

5. Optimal crankshaft speed $n_B$ of combustion engine 10 for power-oriented driving operation without consideration of the capacity of electric motor 12 may be determined. This may be done by taking the intersection of the straight line corresponding to setpoint power $P_{setpoint}$ with control line β.

6. Optimal crankshaft speed $n_{B'}$ of combustion engine 10 for power-oriented driving operation with consideration of the capacity of electric motors 12 (corresponding to signal 74 in FIG. 3) may be determined. This may be done in turn by taking the intersection of the straight line corresponding to setpoint power $P_{setpoint}$ with control line β'.

Next, the optimal crankshaft speed (signal 64) of combustion engine 10 may be determined by arithmetic logic unit 76 from rotational speeds $n_A$, $n_B$ and $n_{B'}$, as a function of signal 78 corresponding to the driving situation and the type of driver. This may be done, e.g., by interpolation.

The explanations so far relate to a parallel hybrid drive 100. In power branching hybrid drives 100, the power of combustion engine 10 may be transmitted electromechanically. This means that both a mechanical and an electrical power path are implemented, through which the vehicle is propelled. The electrical power path is implemented here by at least two electric motors 12, which are positioned in an appropriate manner in the drive train of the motor vehicle. The coupling between the mechanical power path and the electrical power path may be accomplished in a manner via at least one planetary gear that allows a division of power between the mechanical and electrical power paths. The rotational speeds of the electric motors are determined here by the vehicle speed and a chosen transmission ratio of combustion engine 10 to the drive train. The torques are subject to the requirement that the torque of combustion engine 10 may be transmitted to the drive train. As long as electric motors 12 are not operated at their power limit, power ratio VE of the electric motors to each other is available as an additional control variable. The input torque of the hybrid drive may be set using these variables.

Figure 5:
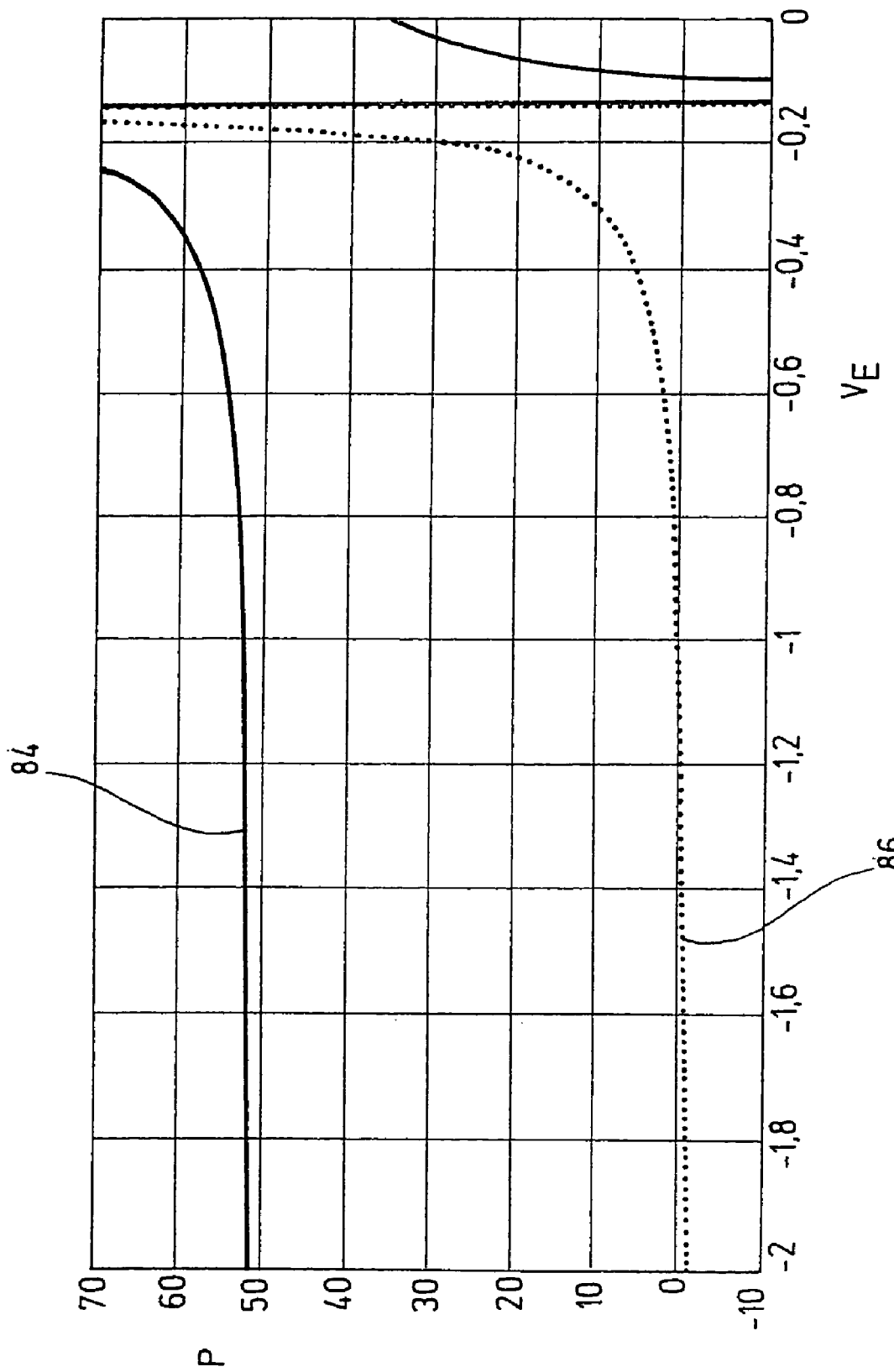
FIG. 5 shows power characteristic curves of a hybrid drive according to an exemplary embodiment of the present invention.

FIG. 5 shows characteristic curves in which power P is plotted over power ratio VE according to an exemplary embodiment of the present invention. A characteristic curve corresponding to the output power of the hybrid drive is recorded as 84. A characteristic curve 86 corresponds to the net power of electric motors 12 as a function of power ratio VE. The power branching hybrid drive works preferentially at a power ratio VE=−1. The net power (characteristic 86) of electric motors 12, which corresponds to the necessary battery power, equals zero in this case. The hybrid drive is able to maintain this operating state permanently.

Short-term increases in the power demands may be compensated for in certain operating states by varying power ratio VE of electric motors 12. The necessary additional power may be taken then from the vehicle battery. The driving behavior of the motor vehicle in this case is comparable to that of a parallel hybrid drive. Thus it is possible to set the setpoint operating state in accordance with the method explained on the basis of parallel hybrid drive 100.

If a significant increase in the output power through a change in power ratio VE is not possible, the driving behavior is comparable to a vehicle propelled only by a combustion engine. In this case a higher dynamic power reserve should be maintained.

This results in the following procedure:

1. The operating points are determined at which an increase in the output power of the hybrid drive is possible for a short period by changing power ratio VE of electric motor 12.

2. Depending on operating parameters such as the vehicle speed, the power setpoint by a driver of the vehicle, battery state and power demand of the ancillary components of the vehicle, an appropriate operating state is selected. The power reserve is kept as small as possible, in order to implement an operating state of combustion engine 10 that provides favorable fuel consumption.

3. If an operating point that achieves this favorable operating state is not found, the system falls back on a default operating point selection for operation with only the combustion engine.

What is claimed is:

1. A method for setting a setpoint operating state of a hybrid drive which includes, as drive motors, an internal combustion engine and at least one electric motor with output shafts mechanically linkable to a drive train of the vehicle, the method comprising:
   determining an optimal crankshaft speed of the combustion engine as a function of an instantaneous power demand on the drive motors of the hybrid drive and an instantaneous power capacity of the drive motors of the hybrid drive; and
   setting the crankshaft speed by coordinatedly controlling the drive motors of the hybrid drive while maintaining the instantaneous power demands.

2. The method of claim 1, wherein the instantaneous power capacity of a vehicle electrical system supplying the at least one electric motor is considered in the instantaneous power capacity of the at least one electric motor.

3. The method of claim 1, wherein the optimal crankshaft speed is selected from a rotational speed range which lies between another optimal rotational speed for economical driving operation and an optimal rotational speed for power-oriented driving operation.

4. The method of claim 1, wherein a power capacity of the combustion engine and a setpoint power of the hybrid drive are considered in determining the optimal crankshaft speed for providing economical driving operation.

5. The method of claim 1, wherein a power capacity of the combustion engine, the power capacity of the at least one electric motor, and a setpoint power of the hybrid drive are considered in determining the optimal crankshaft speed for providing power-oriented driving operation.

6. The method of claim 1, wherein a maximum power of the combustion engine as a function of the crankshaft speed is considered in determining a power capacity of the combustion engine.

7. The method of claim 1, wherein a maximum power of the at least one electric motor usable for propulsion of the vehicle as a function of the crankshaft speed is considered in determining a power capacity of the at least one electric motor.

8. The method of claim 1, wherein current operating conditions of the hybrid drive are considered.

9. The method of claim 8, wherein the current operating conditions include at least one of an atmospheric air pressure and an engine temperature.

10. The method of claim 7, wherein a charge level and a service life of a motor vehicle battery of a vehicle electrical system are considered in determining the maximum power of the at least one electric motor usable for propulsion of the vehicle.

11. The method of claim 1, wherein at least one of a momentary driving situation of the vehicle and a type of driver of the vehicle is considered in determining the optimal crankshaft speed.

* * * * *